(12) United States Patent
Bondarenko (10) Patent No.: US 9,542,420 B2
(45) Date of Patent: Jan. 10, 2017

(54) PREPARING LC/MS DATA FOR CLOUD AND/OR PARALLEL IMAGE COMPUTING (71) Applicant: Infoclinika, Inc., Bellevue, WA (US)

(72) Inventor: Andrey Yur'yevich Bondarenko, Bellevue, WA (US)

(73) Assignee: Infoclinika, Inc., Bellevue, WA (US)

(*) Notice: Subject to any disclaimer, the term of this patent is extended or adjusted under 35 U.S.C. 154(b) by 621 days.

(21) Appl. No.: 13/889,199

(22) Filed: May 7, 2013

(65) Prior Publication Data

US 2014/0156612 A1   Jun. 5, 2014

Related U.S. Application Data

(60) Provisional application No. 61/643,825, filed on May 7, 2012.

(51) Int. Cl.
 *G06F 19/00* (2011.01)
 *G06F 17/30* (2006.01)
 *H01J 49/00* (2006.01)

(52) U.S. Cl.
 CPC ... *G06F 17/30271* (2013.01); *G06F 17/30153* (2013.01); *H01J 49/0036* (2013.01)

(58) Field of Classification Search
 CPC .............. G06F 17/30153; G06F 17/30271; H01J 49/0036
 USPC ................... 707/608, 636; 702/22
 See application file for complete search history.

(56) References Cited

U.S. PATENT DOCUMENTS

| | | | | |
|---|---|---|---|---|
| 5,999,189 A | * | 12/1999 | Kajiya | .................. G06T 11/001 382/232 |
| 7,873,481 B2 | | 1/2011 | Walk | |
| 7,894,650 B2 | * | 2/2011 | Weng | .................. G01N 30/8624 382/128 |
| 8,362,931 B2 | * | 1/2013 | Hunt | .................. H03M 7/30 341/51 |
| 2004/0102906 A1 | | 5/2004 | Roder | |
| 2006/0043281 A1 | | 3/2006 | Yoshinari | |
| 2010/0061605 A1 | | 3/2010 | Fain | |
| 2010/0171032 A1 | | 7/2010 | Wang | |

OTHER PUBLICATIONS

Wiener et al., Analytical Chemistry, vol. 76, No. 20, Oct. 15, 2004, pp. 6085-6096.*
Yang et al., BMC Bioinformatics 2009, 10:4, pp. 1-13.*
Leroy, K., A tool for automating Quantitative Analysis of LC-MS-MS/MS data, 2010, pp. 1-123.*

(Continued)

*Primary Examiner* — Cheyne D Ly
(74) *Attorney, Agent, or Firm* — Christensen O'Connor Johnson Kindness PLLC (57) ABSTRACT

Functionality is described for data management and querying LC/MS spectrometry data, therefore making it easier to store, retrieve, transfer, and process the mass spectrometry data. The functionality transforms a plurality of raw LC/MS files obtained from a biological experiment into a set of LC/MS images on a common M/Z and RT grid compatible for image processing (e.g., time alignment, peak detection and quantification, differential analysis, etc.). The functionality then spits large LC/MS images into smaller chunks, therefore making easier parallel querying and processing using cloud or high performance computing systems.

21 Claims, 12 Drawing Sheets

(56) References Cited

OTHER PUBLICATIONS

Nagavaram, A., Cloud Based Dynamic Workflow with QOS for Mass Spectrometry Data Analysis, The Ohio State University, pp. 1-62, 2011.*

International Search Report and Written Opinion mailed Sep. 26, 2013, in corresponding International Application No. PCT/US2013/039988, filed May 7, 2013, 9 pages.

* cited by examiner

PREPARING LC/MS DATA FOR CLOUD AND/OR PARALLEL IMAGE COMPUTING

CROSS-REFERENCE TO RELATED APPLICATION

This application claims the benefit of Provisional Application No. 61/643,825, filed May 7, 2012, which is incorporated herein by reference.

TECHNICAL FIELD

The present subject matter is generally related to data management, and more particularly, relates to preparing mass spectrometer data (LC/MS) for storage, parallel processing, and analysis.

BACKGROUND

A biomarker discovery process using mass spectrometry data has several challenges. One of them is the amount of LC/MS data generated by the instrument for a biological experiment. For example, an average mass spectrometry file can be up to 10 gigabytes and an experiment with 100 samples will be 1 terabyte of data. These data need to be processed using CPU- and memory-extensive image-processing and statistical methods to detect peaks of interest as the potential biomarkers. Future increases in the precision and efficiency of mass spectrometers will increase the above-noted challenges—by potentially providing the capacity to generate even greater volumes of mass spectrometry data over decreasing spans of time.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One aspect includes a method form of the subject matter which recites a method for managing experimental data. The method comprises unifying raw LC/MS data generated from different formats to create LC/MS images, chunking the LC/MS images to facilitate parallel processing, and compressing chunked LC/MS images to facilitate storage.

Another aspect includes a system form of the subject matter which recites a system, which comprises format-unifying hardware suitable for unifying raw LC/MS data generated from different formats to create LC/MS images. The unifying hardware is further suitable for calculating a global RT grid and a global M/Z grid. The system further comprises chunking hardware capable of chunking the LC/MS images to facilitate parallel processing and compression hardware having the capacity to compress chunked LC/MS images to facilitate storage.

A further aspect includes a computer-readable form of the subject matter which recites a computer-readable medium, which is tangible, having stored thereon computer-executable instructions for implementing a method for managing experimental data. The computer-readable medium comprises unifying raw LC/MS data generated from different formats to create LC/MS images, chunking the LC/MS images to facilitate parallel processing, and compressing chunked LC/MS images to facilitate storage.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

To understand biological processes, scientists are discovering biomarkers so as to leverage molecular profiling technologies. A biomarker is a molecule that can be measured to indicate a biological event or health outcome. For example, biomarkers can be used to predict disease predisposition, progression, or outcome; drug response or adverse effects. Biomarker research is an important part of drug discovery and development including: target identification; proof of mechanism; treatment and safety monitoring; patient selection and recruiting to clinical trials; and outcome measurement. Mass spectrometry has been a key part of biomarker discovery and evaluation owing to several important attributes, which include sensitive and selective detection, multi-analyte analysis, and the ability to provide structural information. Because of these capabilities, mass spectrometry has been widely deployed in the search for new markers both through the analysis of large molecules (proteomics) and small molecules (metabolomics or metabonomics).

More specifically, one of the approaches for biomarker discovery using mass spectrometry is to record liquid chromatography-mass spectrometry (LC/MS) spectra, where a biological substance is separated by retention time using liquid (LC) or gas chromatography (GC) and by mass over charge using mass spectrometer (MS). Each data point (or data cell) measured by the mass spectrometer comprises three data values: a retention time (RT) data value; a mass-to-charge (M/Z) data value; and an intensity (I) data value. The RT data value relates to a time at which the mass spectrometer makes a plurality of M/Z measurements and intensity measurements. The M/Z data value refers to an individual M/Z measurement for a particular RT data value. The intensity data value refers to an individual intensity measurement for a particular RT data value and M/Z data value. The LC/MS spectra acquired by the instrument are represented as a list of LC/MS scans where each scan is an MS spectrum at a particular retention time. The MS spectrum consists of M/Z and intensity measurements.

Recent advances in distributed computational and data storage platforms like cloud or high performance computing provide a way for parallel processing of large volumes of experimental data. The cost of LC/MS data analysis will depend on the total amount of data in the experiment. The reduction and compression of LC/MS data will reduce storage and I/O requirements. The splitting of LC/MS images into chunks and random access to the arbitrary RT and M/Z ranges of a plurality of LC/MS images is desired for parallel processing and optimal utilization of computational resources.

Figure 1:
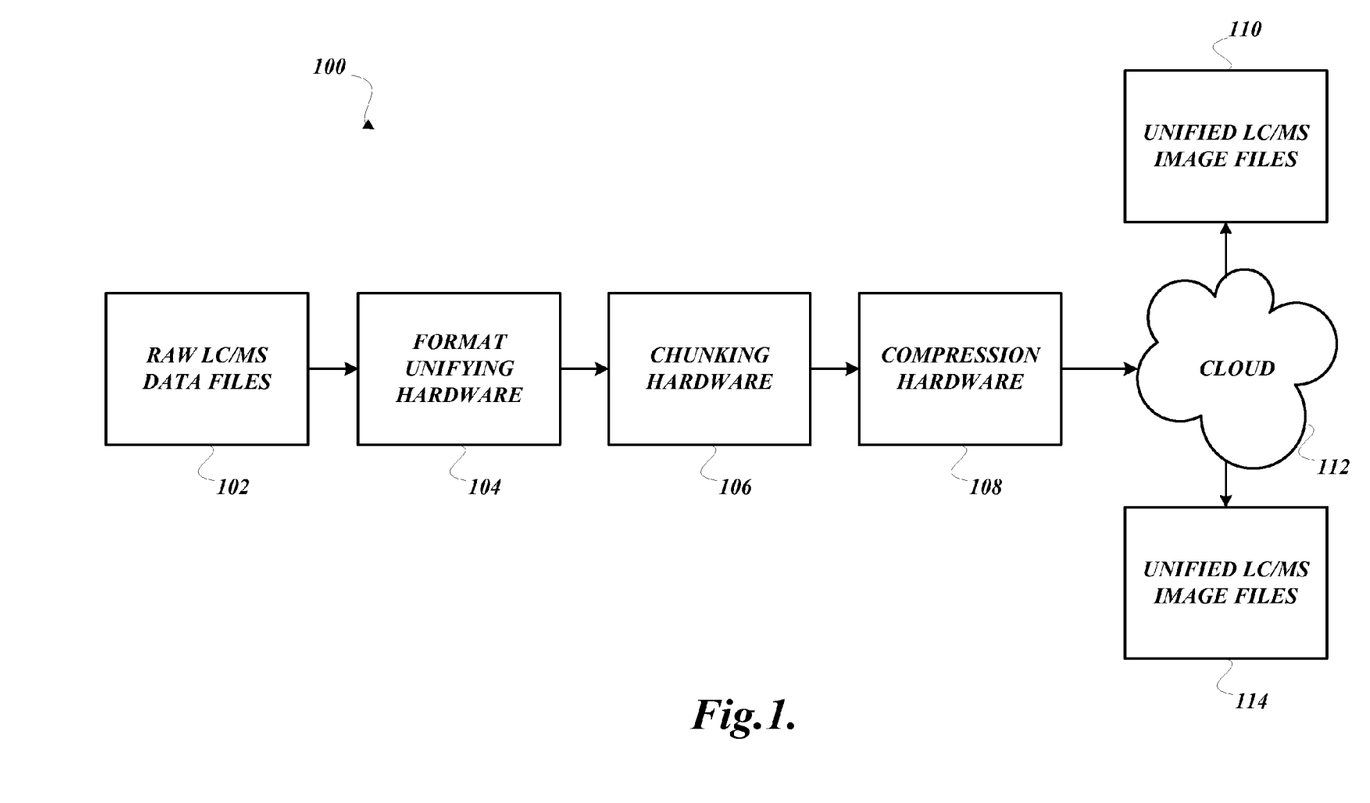
FIG. 1 is a block diagram illustrating an archetypical system for facilitating data management in an embodiment of the present subject matter.

Various embodiments of the present subject matter are directed to data management and random access of mass spectrometer data (LC/MS) acquired from a plurality of biological samples for facilitating storage, parallel processing, and analysis using multi-core and/or multi-node cloud or high performance computing (HPC) infrastructure 112. Various embodiments engineer a raw LC/MS format-unifying hardware 104, a system 100, an LC/MS data query service (not shown), and a method 2000 suitable for experimental data management on either the cloud or high performance computing infrastructure 112. The format-unifying hardware 104 converts LC/MS raw data into a new data format suitable for storage, querying, and parallel processing of experimental data using either the cloud and/or HPC computing infrastructure 112. The format-unifying hardware 104 operates by receiving experimental data, which consists of a plurality of raw LC/MS data files 102 obtained from a mass spectrometer.

Various embodiments engineer the format-unifying hardware 104 so that it is capable of reducing an amount of experimental data by limiting the amount of converted LC/MS data based on specified RT (retention time) and M/Z (mass/charge) ranges of interest. Various embodiments engineer the format-unifying hardware 104 so that it has capacity to reduce the amount of experimental data by calculating global M/Z and RT grids for all files in the biological experiment. The calculated M/Z grid preserves data accuracy and resolution for M/Z measurements and preserves an average sampling rate for the RT values. Various embodiments engineer the format-unifying hardware 104 so that it is suitable for converting raw LC/MS files from a biological experiment into LC/MS images. An LC/MS Image is defined by a two-dimensional matrix, M/Z grid, and RT grid. Rows and columns of the matrix correspond to the M/Z and RT values of the calculated grids and intensity values are interpolated as raw LC/MS data intensities into a new grid.

Various embodiments engineer chunking hardware 106 that is capable of splitting LC/MS images into chunks where each chunk n across all files in the biological experiment corresponds to the same M/Z and RT ranges. The chunks can be stored on network or cloud file systems and leveraged for parallel processing using a multi-core CPU or multi-node computer system on cloud or high performance computing infrastructures 112. Various embodiments engineer the method 2000, which when executed on a compression hardware 108, has the capacity to compress LC/MS images for easier storage and retrieval. The method 2000 allows reducing storage and I/O system requirements for the data management and image processing. The compression hardware 108 suitably can remove instrument background and chemical noise prior to compression for further data reduction.

Various embodiments engineer the method 2000 which is capable of storing converted or unified LC/MS images 110, 114 for the biological experiment in a file system. The stored data consists of a directory structure, RT and M/Z grid file, and the chunk files corresponding to the LC/MS images. The file system can be local, network, or distributed. Various embodiments engineer an LC/MS data query hardware having the capacity to return the LC/MS images, spectrum, or chromatogram for the queried and list of biological samples, RT and M/Z ranges.

Mass spectrometry is a commonly used technique for biomarker discovery and evaluation owing to several important attributes, which include sensitive and selective detection, multi-analyte analysis, and the ability to provide structural information. Because of these capabilities, mass spectrometry has been widely deployed in the search for new markers both through the analysis of large molecules (proteomics) and small molecules (metabonomics). In addition, mass spectrometry is increasingly being used to support quantitative measurement to assist in the evaluation and validation of biomarker leads. The quantitative approach is looking for the differences between two or more physiological states or conditions of a biological system. The common workflow for quantitative biological experiments starts with an experiment design for a hypothesis. Experiment design can be a simple binary comparison between two conditions or a complex multi-factorial design with collected biological and/or technical replicates. Collected samples in an experiment are prepared in the sample preparation step using one-dimensional separation or multidimensional separation, for labeled workflow or label-free workflow. An LC/MS instrument separates analytes extracted from a collected sample in time by their chemical properties using a chromatography step. Further separation of ionized analytes by mass-over-charge is done by mass spectrometer using one of the instrument types. The instrument generates raw files for every sample in a biological experiment. Commonly, raw files have a vendor-specific data format and can be accessed using an operating system dependent API. The raw LC/MS files obtained from an instrument are in a workflow step. One of the exemplary aspects of LC/MS data processing is LC/MS image processing for peak detection, quantization, and identification. The other commonly applied techniques for raw files are LC/MS/MS data processing and $MS^E$ data processing. A statistical analysis can be performed on peak quantitative values obtained. The analysis results can be visualized and verified using charts, plots, and reports.

In detail, the analytes from prepared samples are separated by liquid chromatography (LC) or similarly by gas chromatography (GC) before they are introduced to the ion source and mass spectrometer where they are further separated by mass-over-charge. The LC/MS data saved in the raw file obtained from the instrument commonly consists of a plurality of mass scans at corresponding retention times (RT). Typically, the achromatography mobile phase is set to a specific time length and the mass spectrometer is set to scan a specific mass range. A single mass scan can take anywhere from 0 milliseconds to 1 second depending on the type of scan. A mass scan consists of a plurality of mass-over-charge (M/Z) and intensity (I) value pairs. Various embodiments engineer the format-unifying hardware 104 so as to have the capacity to convert vendor-specific and operating system (OS) dependent raw LC/MS data files into LC/MS images, which are stored using independent file format compatible for processing on all operating systems.

FIGS. 2A-2K illustrate the software method 2000 for experimental data management on either the cloud or high performance computing infrastructure. From the start block (FIG. 2A), the method 2000 proceeds to a set of method steps 2002, defined between a continuation terminal ("terminal A") and an exit terminal ("terminal B"). The set of method steps 2002 describes unifying raw LC/MS data in different equipment formats into one unifying format (via global grids) to facilitate management of unified LC/MS image files.

Figure 2A:
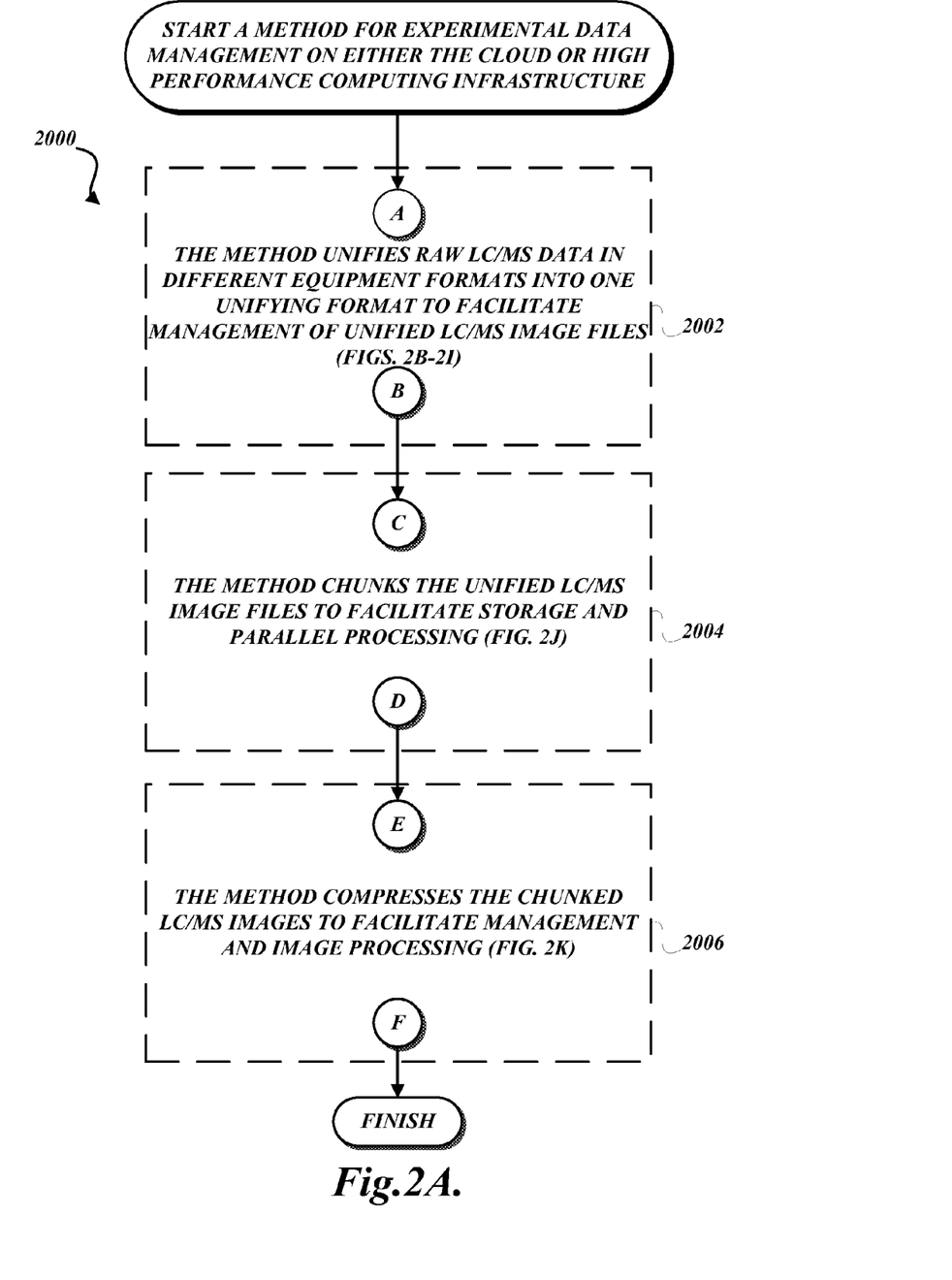
FIGS. 2A-2K are process diagrams illustrating an archetypical method for experimental data management on either the cloud or high performance computing infrastructure.

In general, the input into the method steps 2002 are raw LC/MS files obtained for a biological experiment, and specified RT and M/Z ranges. The method steps 2002 convert raw LC/MS files into LC/MS images based on calculated M/Z and RT grids. The calculated grids are global for the experiment and common for all files in the experiment. The creation of a global M/Z grid reduces the number of stored M/Z values. An M/Z value is stored only once for all files in the experiment rather than with every intensity measurement in a mass scan as an "M/Z, Intensity" pair. The global RT grid is stored once for all files in the experiment rather than for each file. Intensity matrices of LC/MS images for all files are defined by the same global M/Z grid and RT grid. Each intensity matrix is calculated from a corresponding raw file. The system 100 limits the amount of converted data based on specified RT and M/Z ranges. A common practice is to remove data collected at the beginning and at the end of the chromatography step related to the non-sample components. The specified M/Z and RT ranges further reduce the amount of stored data focusing only on the LC/MS area of interest.

Getting into the specifics, from terminal A (FIG. 2B), the method 2000 proceeds to block 2008 where the method defines a biological experiment and identifies raw LC/MS files for the conversions that are part of the biological experiment. In some embodiments, the method 2000 receives or specifies parameters for the conversion. At block 2010, the method creates records for the biological experiment and directories on a file system to store unified files of the biological experiment. At block 2012, executing on the format-unifying hardware 104, the method receives raw LC/MS files obtained for the biological experiment. At block 2014, the method prepares to determine an RT range and M/Z range of interest to limit the amount of converted data. Block 2016 describes a proposed technique to visually inspect the total ion current chromatogram to detect the time range when a biological sample starts eluting at a time point from a column and ends eluting at another time point. At block 2018, the method describes how to determine an M/Z range where signals are present by visually inspecting a spectrum in the time range of interest.

Figure 2B:
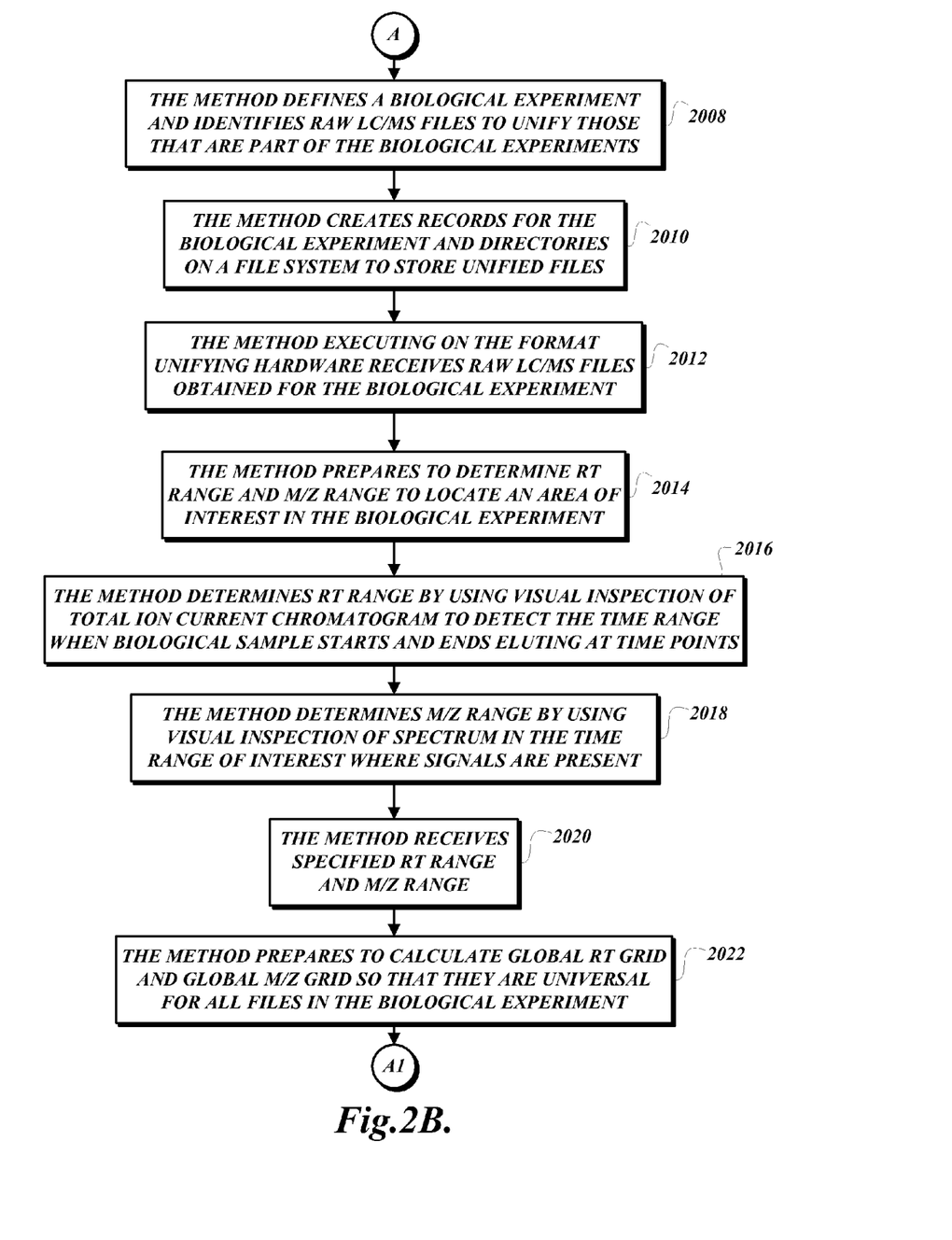
Figure 2C:
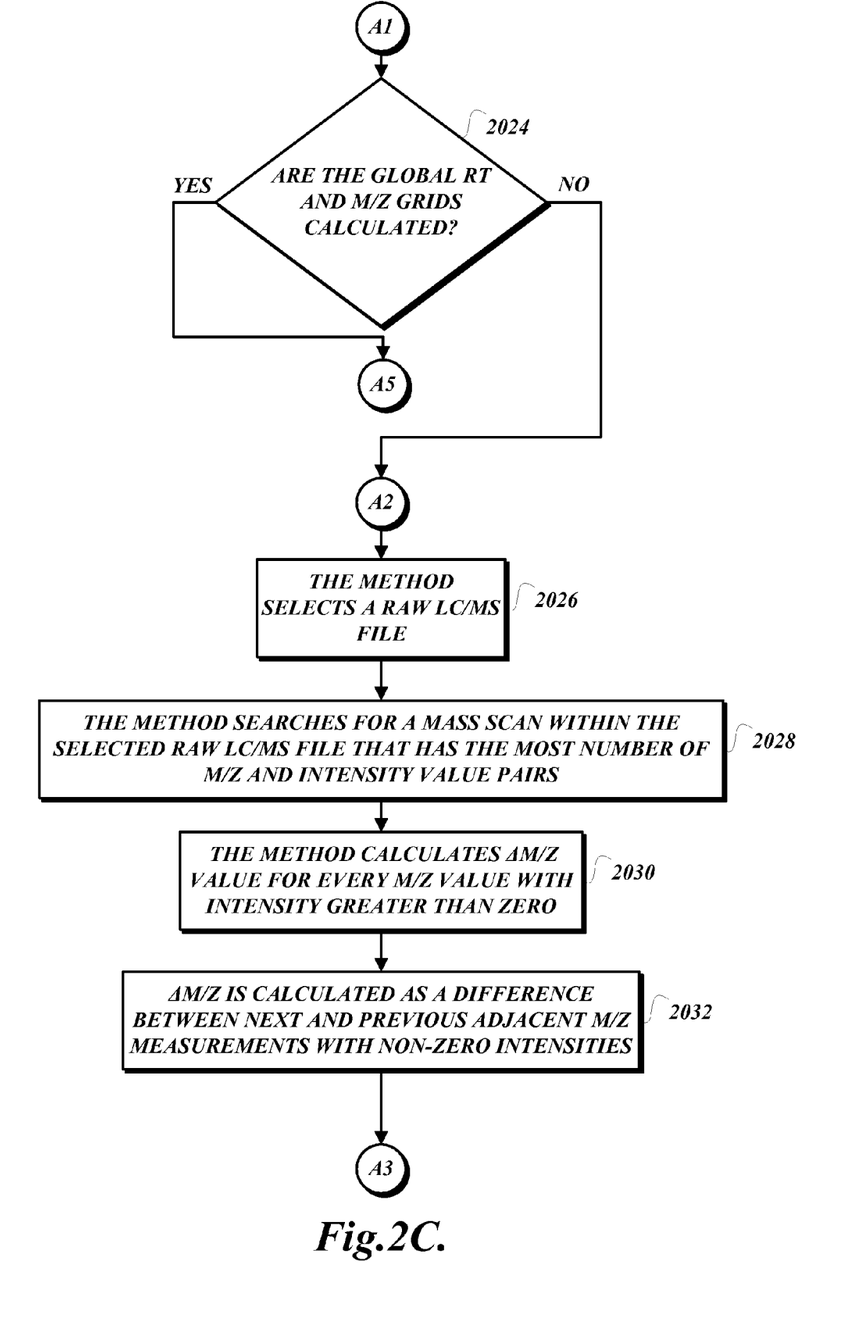

The method receives the specified RT range and M/Z range at block 2020. The method, at block 2022, prepares to calculate global M/Z and RT grids and subsequently creates LC/MS images by interpolating raw intensities into an intensity matrix with rows and columns corresponding to the global M/Z and RT grids. (During creation of LC/MS images, the method iterates through all raw LC/MS files in the biological experiment to convert them into LC/MS images.) The method then continues to another continuation terminal ("terminal A1").

From terminal A1 (FIG. 2C), the method 2000 continues to decision block 2024 where a test is performed to determine whether the global M/Z and RT grids were calculated. If the answer to the test at decision block 2024 is YES, the method proceeds to another continuation terminal ("terminal A5"). Otherwise, the answer to the test at decision block 2024 is NO, and the method proceeds to another continuation terminal ("terminal A2"). Progressing beyond terminal A2 (FIG. 2C), the method proceeds to block 2026 where the method selects a raw LC/MS file. At block 2028, the method searches for a mass scan within the selected raw LC/MS file that has the higher number of M/Z and intensity value pairs. At block 2030, the method calculates ΔM/Z value for every M/Z value with an intensity greater than zero. At block 2032, ΔM/Z is calculated as a difference between next and previous adjacent M/Z measurements with non-zero intensities. The method then continues to another continuation terminal ("terminal A3").

Figure 2D:
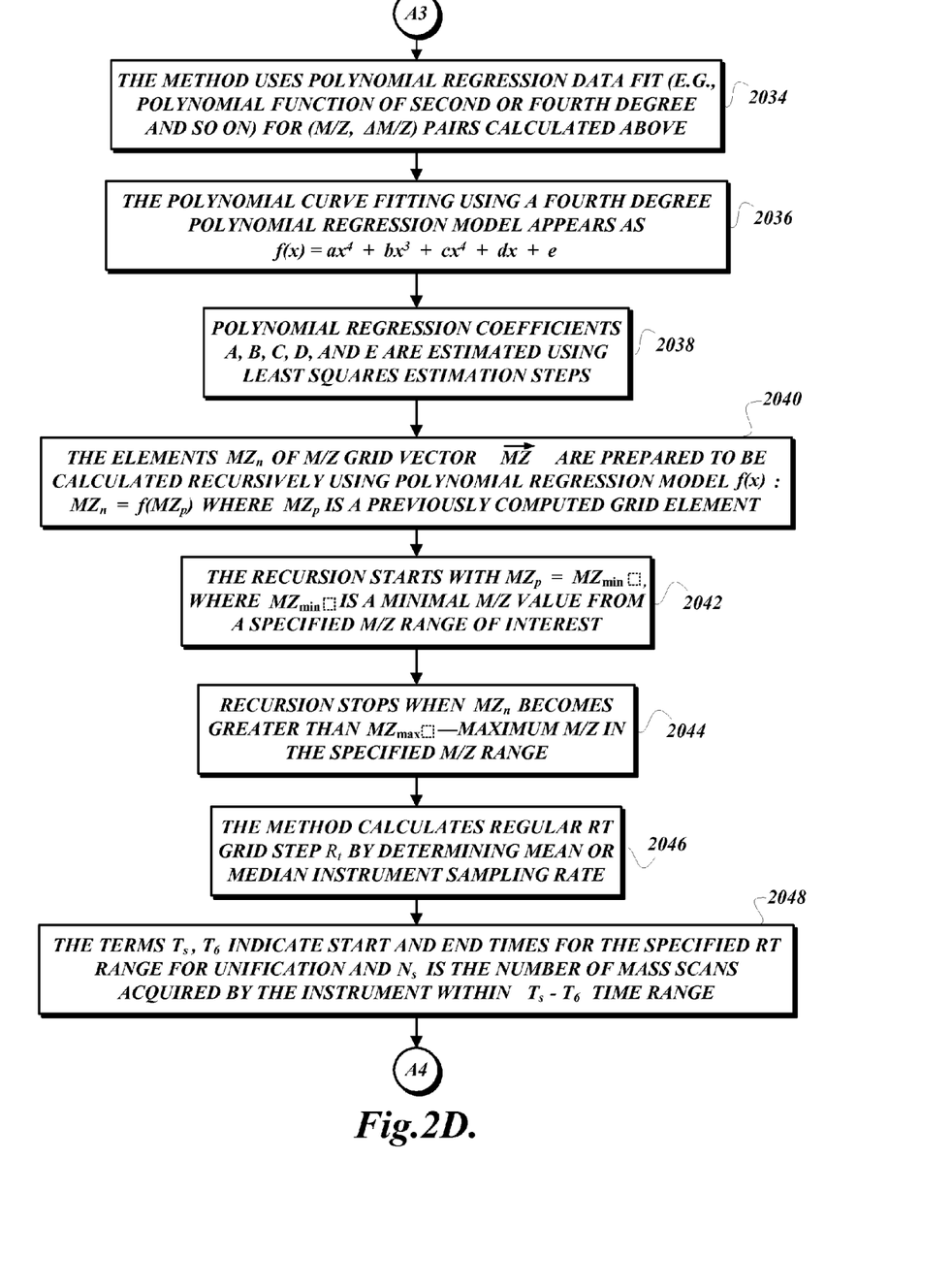

From terminal A3 (FIG. 2D), the method proceeds to block 2034 and uses polynomial regression data fit for (M/Z, ΔM/Z) pairs calculated above. The polynomial function of second or fourth degree is suitable for use. At block 2036, the polynomial curve fitting using a fourth-degree polynomial regression model appears as follows:

$$f(x)=ax^4+bx^3+cx^4+dx+e$$

At block 2038, the polynomial regression coefficients a, b, c, d, and e are estimated using least squares estimation techniques. At block 2040, the elements $MZ_n$ of M/Z grid vector $\overrightarrow{MZ}$ are prepared to be calculated recursively using polynomial regression model f(x):

$$MZ_n=f(MZ_p)$$

where $MZ_p$ is a previously computed grid element. At block 2042, the recursion starts with $MZ_p=MZ_{min}$, where $MZ_{min}$ is a minimal M/Z value from user-specified M/Z range of interest. At block 2044, recursion stops when $MZ_n$ becomes greater than $MZ_{max}$—maximum M/Z in the specified M/Z range. At block 2046, the method calculates regular RT grid step $R_t$ by determining mean or median instrument sampling rate.

At block 2048, the terms $T_s$, $T_e$ indicate start and end times for the specified RT range for conversion, and $N_s$ is the number of mass scans acquired by the instrument within the $T_s$–$T_e$ time range. An alternative method of determining RT grid step $R_t$ is by computing a median instrument sampling rate from the list of ΔRTs calculated from all consecutive RT values. The method then continues to another continuation terminal ("terminal A4").

Figure 2E:
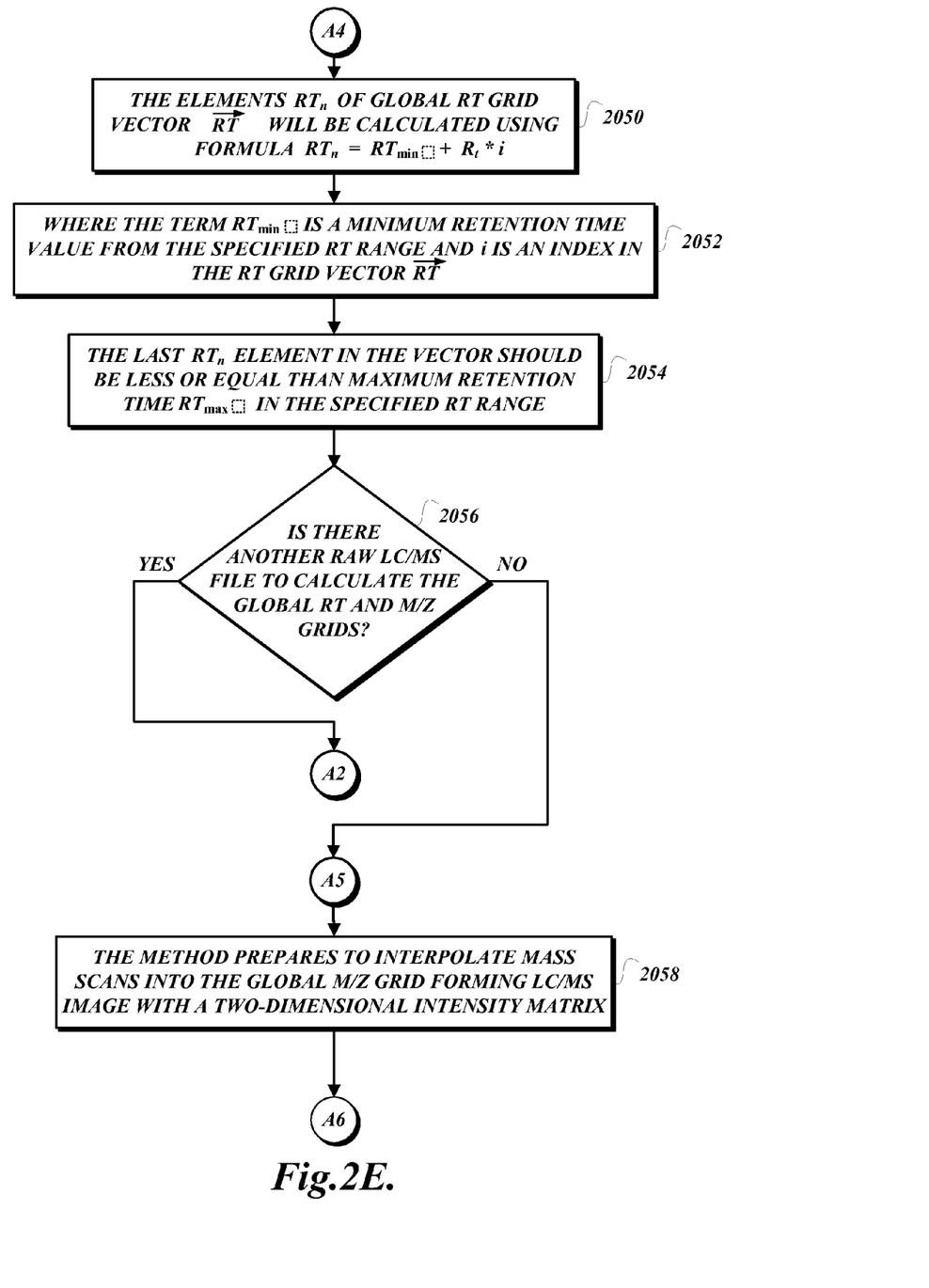

From terminal A4 (FIG. 2E), the method proceeds to block 2050 where the elements $RT_n$ of global RT grid vector $\overrightarrow{RT}$ are calculated using formula $$RT_n=RT_{min}+R_t*i$$

where, at block 2052, the term $RT_{min}$ is a minimum retention time value from a specified RT range in the method 2000 and i is an index in the RT grid vector $\overrightarrow{RT}$. At block 2054, the last $RT_n$ element in the vector should be less than or equal to the maximum retention time $RT_{max}$ in the specified RT range. The method then continues to decision block 2056 where a test is performed to determine whether there is another raw LC/MS file to calculate the global RT and M/Z grids. If the answer to the test at decision block 2056 is YES, the method continues to terminal A2 and skips back to block 2026 where the above-identified processing steps are repeated. Otherwise, if the answer to the test at decision block 2056 is NO, the method continues to terminal A5 and further proceeds to block 2058 where the method prepares to interpolate mass scans into the global M/Z grid forming an LC/MS image with a two-dimensional intensity matrix. For simplicity of explanation, rows of the matrix correspond to the global M/Z grid values and columns of the matrix correspond to the raw RT values. The method 2000 prepares to iterate through all mass scans with retention time values between $RT_{min}$ and $RT_{max}$. The method continues to another continuation terminal ("terminal A6").

Figure 2F:
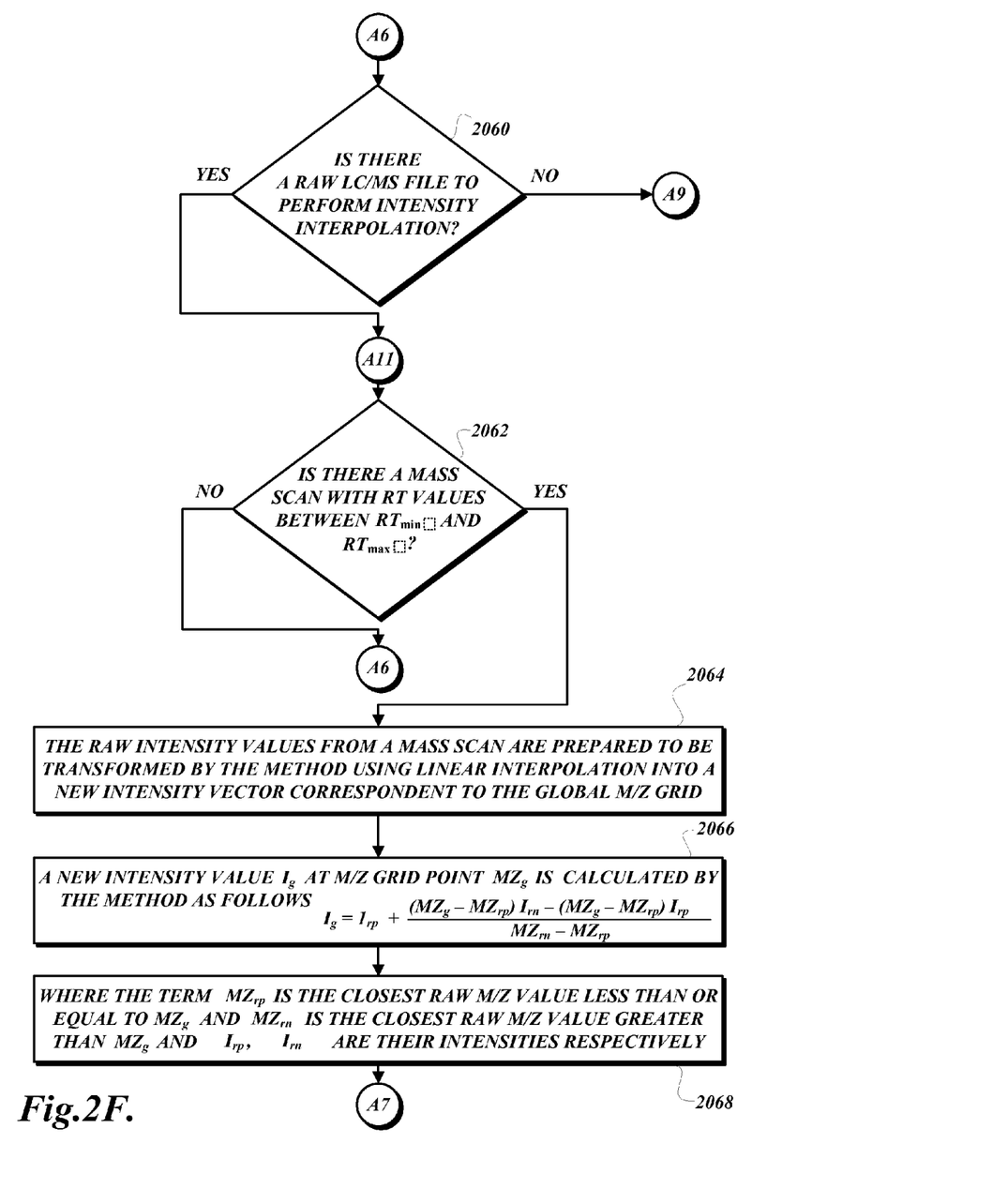
Figure 2G:
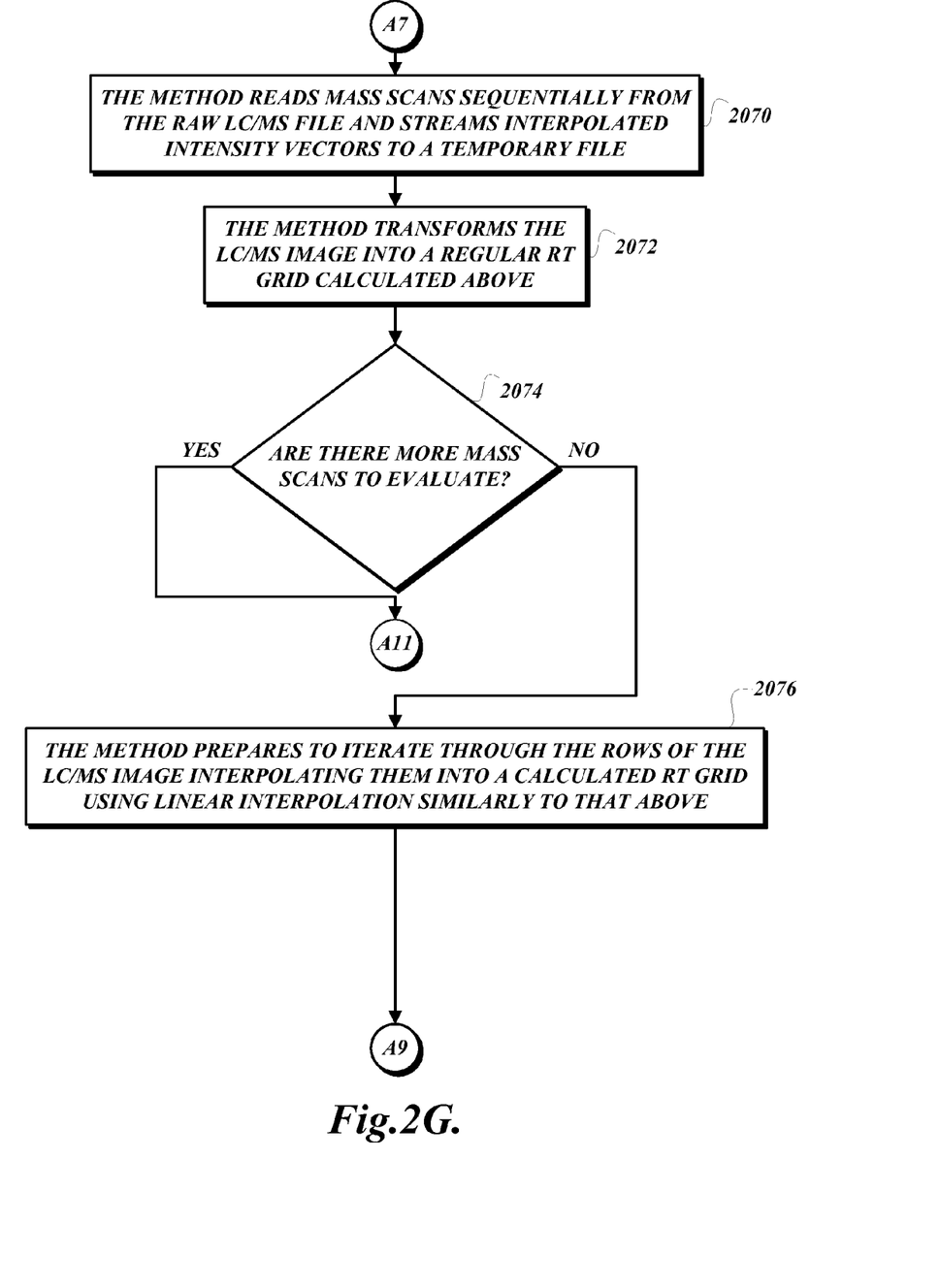

From terminal A6 (FIG. 2F), the method continues to decision block 2060 where a test is performed to determine whether there is a raw LC/MS file to perform intensity interpolation. If the answer to the test at decision block 2060 is NO, the method continues to another continuation terminal ("terminal A9"). If instead the answer to the test at decision block 2060 is YES, the method continues to another continuation terminal ("terminal A11"). From terminal A11 (FIG. 2F), the method continues to decision block 2062 where a test is performed to determine whether there is mass scan with retention time values between $RT_{min}$ and $RT_{max}$. If the answer to the test at decision block 2062 is NO, the method skips back to decision block 2060 where the above-identified processing steps are repeated. Otherwise, the answer to the test at decision block 2062 is YES, and the method proceeds to block 2064 where the raw intensity values from a mass scan are prepared to be transformed using linear interpolation into a new intensity vector corresponding to the global M/Z grid. At block 2066, a new intensity value $I_g$ at M/Z grid point $MZ_g$ calculated using the following formula:

$$I_g = I_{rp} + \frac{(MZ_g - MZ_{rp})I_m - (MZ_g - MZ_{rp})I_{rp}}{MZ_m - MZ_{rp}}$$

where, at block 2068, the term $MZ_{rp}$ is the closest raw M/Z value less than or equal to $MZ_g$ and $MZ_{rm}$ is the closest raw M/Z value greater than $MZ_g$ and $I_{rp}$, $I_{rm}$ are their intensities, respectively. The method continues to another continuation terminal ("terminal A7").

From terminal A7 (FIG. 2G), the method proceeds to block 2070 where the method reads mass scans sequentially from the raw LC/MS file and streams interpolated intensity vectors to a temporary file to avoid having two copies of LC/MS data in memory to prevent having a file size greater than available operating memory. At block 2072, the method transforms the LC/MS image obtained into a regular RT grid calculated above. The method proceeds to decision block 2074 where a test is performed to determine whether there are more mass scans to evaluate. If the answer to the test at decision block 2074 is YES, the method continues to terminal A11 and skips back to decision block 2062 where the above-identified processing steps are repeated. Otherwise, if the answer to the test at decision block 2074 is NO, the method proceeds to block 2076 where the method prepares to iterate through the rows of LC/MS images interpolating them into a calculated RT grid using linear interpolation similarly to that described above. The method continues to another continuation terminal ("terminal A9").

Figure 2H:
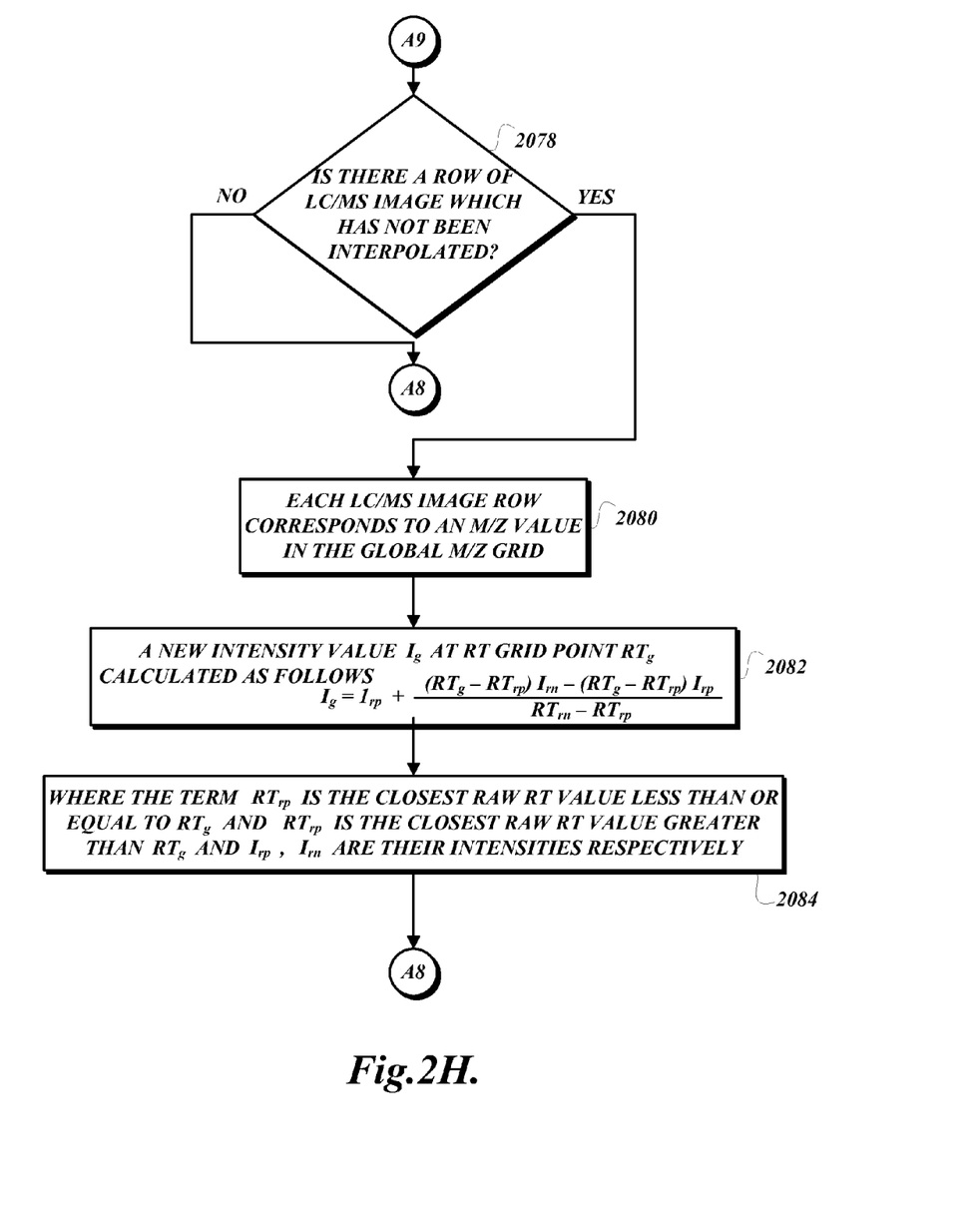
Figure 2I:
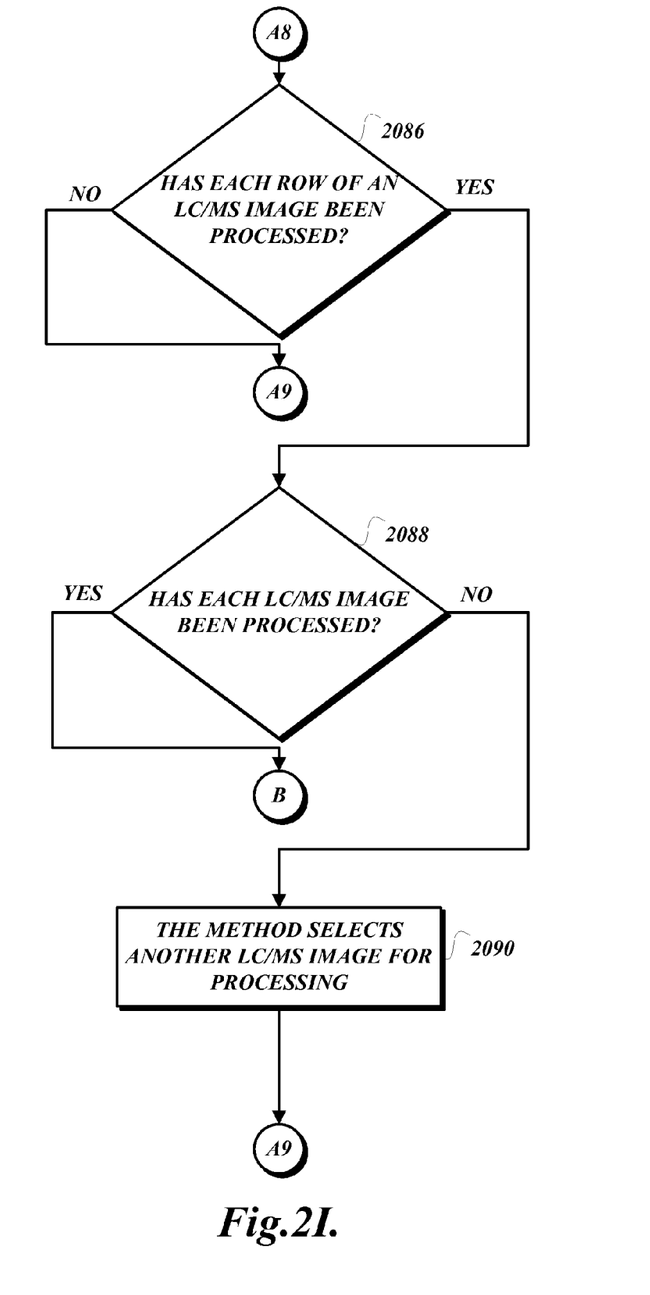

From terminal A9 (FIG. 2H), the method continues to decision block 2078 where a test is performed to determine whether there is a row of LC/MS images which has not been interpolated. If the answer to the test at decision block 2078 is NO, the method continues to another continuation terminal ("terminal A8"). Otherwise, the answer to the test at decision block 2078 is YES, and the method continues to block 2080 where each LC/MS image row corresponds to an M/Z value in the global M/Z grid. At block 2082, a new intensity value $I_g$ at RT grid point $RT_g$ is calculated by the following formula:

$$I_g = I_{rp} + \frac{(RT_g - RT_{rp})I_m - (RT_g - RT_{rp})I_{rp}}{RT_m - RT_{rp}}$$

where, at block 2084, the term $RT_{rp}$ is the closest raw RT value less than or equal to $RT_g$ and $RT_{rm}$ is the closest raw RT value greater than $RT_g$ and $I_{rp}$, $I_{rm}$ are their intensities, respectively. The method continues to another continuation terminal ("terminal A8").

From terminal A8 (FIG. 2I), the method proceeds to decision block 2086 where a test is performed to determine whether each row of an LC/MS image has been processed. If the answer to the test at decision block 2086 is NO, the method continues to terminal A9 and skips back to decision block 2078 where the above-identified processing steps are repeated. Otherwise, if the answer to the test at decision block 2086 is YES, the method proceeds to decision block 2088 where another test is performed to determine whether each LC/MS image has been processed. If the answer to the test at decision block 2088 is YES, the method proceeds to terminal B. Otherwise, if the answer to the test at decision block 2088 is NO, the method proceeds to block 2090 where the method selects another LC/MS image for processing. The method then continues to terminal A9 and skips back to decision block 2078 where the above-identified processing steps are repeated.

From terminal B (FIG. 2A), the method proceeds to a set of method steps 2004 defined between continuation terminals ("terminal C"), ("terminal D"). The set of method steps 2004 prepares to calculate chunk sizes and chunks the unified LC/MS image files to facilitate storage and parallel processing. The method chunks LC/MS images in M/Z direction for parallel querying of LC/MS images facilitated by a query module, and facilitating further parallel image processing or visualization. The LC/MS image query module can leverage computer systems with multiple CPU cores and/or computational nodes for parallel data reading from chunk files. The method chunks LC/MS images suitably in M/Z direction. The reason is size difference between M/Z and RT grids. A typical size of an M/Z grid for high resolution instruments is around 1 million grid units and a typical size of RT grid is around 10 thousand grid units, which is two orders of magnitude smaller than an M/Z grid. The chunks with the same number for different files in an experiment have the same dimensions and belong to the same M/Z range of the global M/Z grid. The chunk size can be calculated based on available operating memory on a computational unit.

Figure 2J:
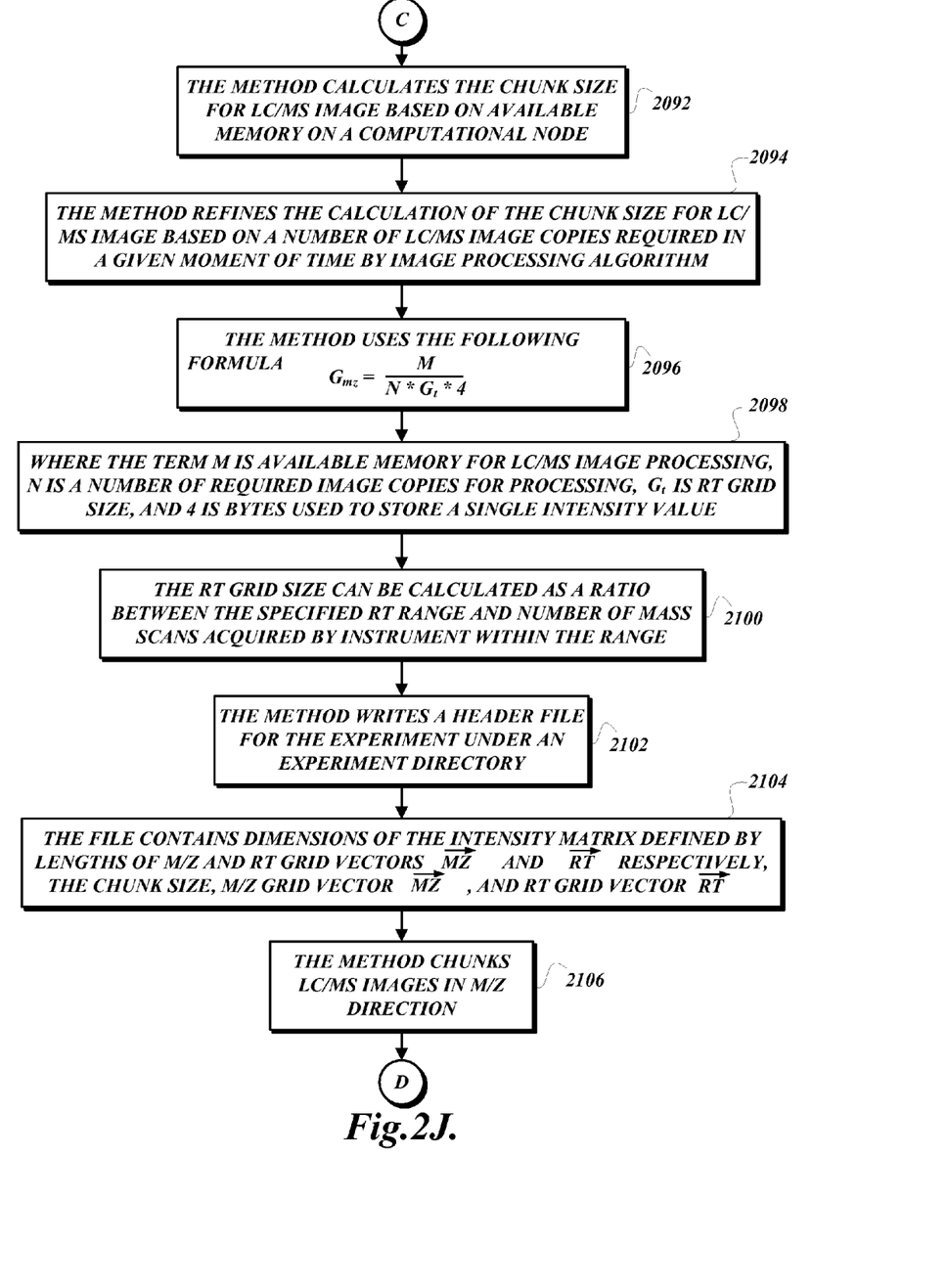
Figure 2K:
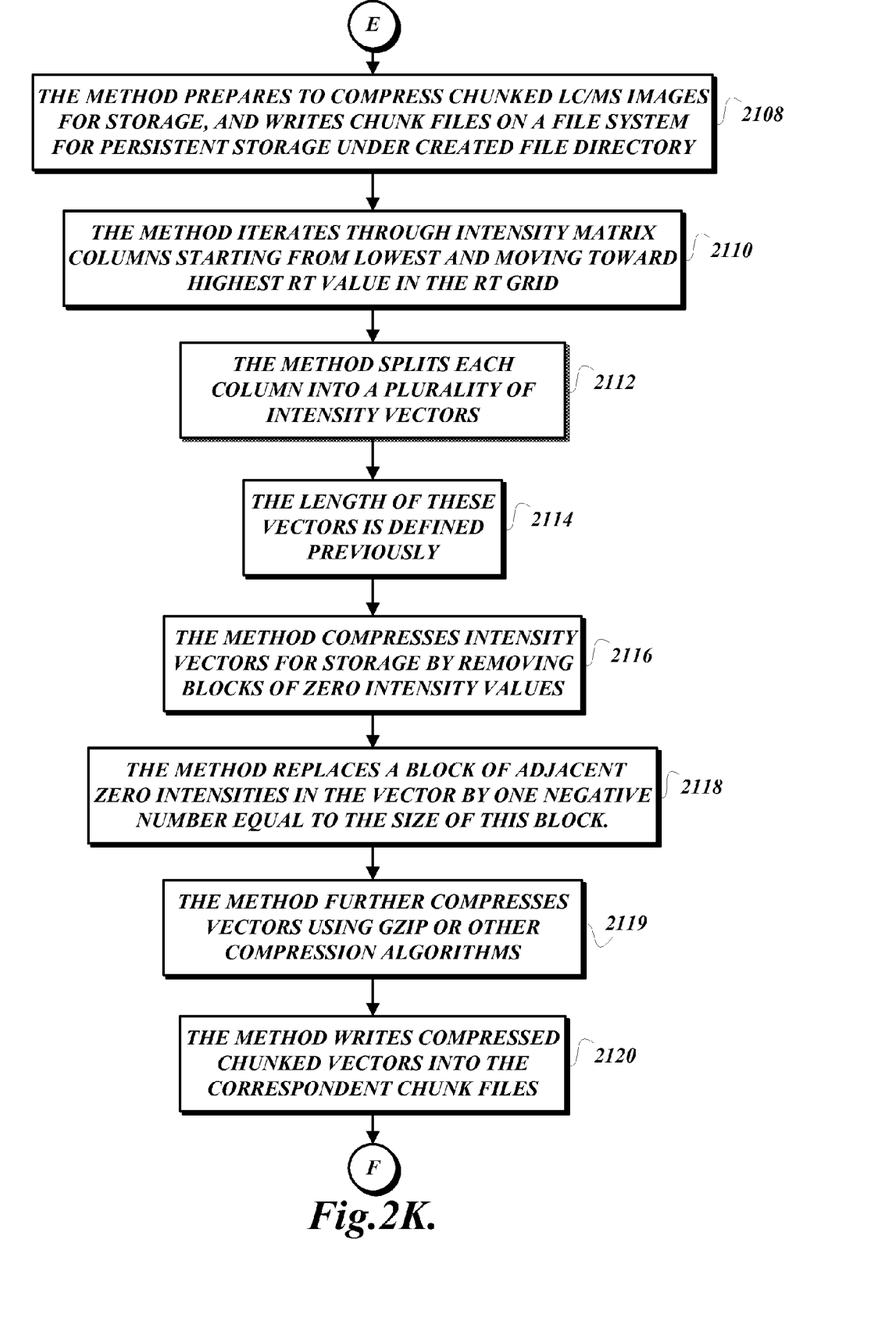

From terminal C (FIG. 2J), the method proceeds to block 2092 where the method calculates the chunk size for an LC/MS image based on available memory on a computational node. At block 2094, the method refines the calculation of the chunk size for an LC/MS image based on the number of LC/MS image copies required in a given moment of time by image processing algorithm. At block 2096, the method uses the proposed formula:

$$G_{mz} = \frac{M}{N * G_t * 4}$$

where, at block 2098, the term M is available memory for LC/MS image processing, N is a number of required image copies for processing, $G_t$ is RT grid size, and 4 is the number of bytes used to store a single intensity value. At block 2100, the RT grid size can be calculated as a ratio between the specified RT range and number of mass scans acquired by an instrument within the range. The method at block 2102 writes a header file for the experiment under an experiment directory. At block 2104, the file contains dimensions of the intensity matrix defined by lengths of M/Z and RT grid vectors $\overrightarrow{MZ}$ and $\overrightarrow{RT}$ respectively, the chunk size calculated in the method 2000, M/Z grid vector $\overrightarrow{MZ}$, and RT grid vector $\overrightarrow{RT}$. (The method optionally submits the list of raw files, M/Z range, RT range, and chunk size as input parameters for the conversion in previous steps.) At block 2106, the method chunks LC/MS images in M/Z direction. The method then continues to terminal D.

From terminal D (FIG. 2A), the method proceeds to a set of method steps 2006, defined between continuation terminals ("terminal E"), ("terminal F"). The set of method steps 2006 compresses the chunked LC/MS images to facilitate management and image processing. From terminal E (FIG. 2K), the method proceeds to block 2108 where the method prepares to compress chunked LC/MS images for storage, and writes chunked files on a file system for persistent storage under a created file directory. At block 2110, the method iterates through intensity matrix columns starting from the lowest and moving toward the highest RT value in the RT Grid. At block 2112, the method splits each column into a plurality of intensity vectors. The length of these vectors is defined previously. See block 2114. At block 2116, the method compresses intensity vectors for storage by removing blocks of zero intensity values. At block 2118, the method replaces a block of adjacent zero intensities in the vector by one negative number qual to the size of this block. The negative number is used to make a distinction between the number of replaced zeros and the intensity value, which is always positive. The resulting vector of intensity can be further compressed by one of the standard compression algorithms like gzip. At block 2119, the method further compresses vectors using gzip or other compression algorithms. At block 2120, the method writes compressed chunked vectors into the corresponding chunked files. The above compression steps are repeated for all columns of the intensity matrix o create LC/MS chunked files. Every chunked file stores an LC/MS image associated with some M/Z range within a global M/Z grid. The chunked files of the LC/MS image are created under a corresponding LC/MS image directory. The name of the chunked file may contain a chunk number to make locating a chunk of interest easier. An individual chunked file consists of header and concatenated compressed intensity vectors. The header contains row and column counts for the intensity matrix stored in the chunked file and a vector with length of column count. The index of this vector corresponds to the column index associated with RT grid and the value is the length of the compressed intensity vector for the column written to the file. The header data enables random access to read any column by calculating a start position in the file and the number of bytes to read. The method then continues to terminal F and terminates execution.

In one embodiment, the method continues to the following steps before termination of execution. The LC/MS image query module serves requests for LC/MS images, sub-images, or chunks across a plurality of biological samples. An LC/MS sub-image is an LC/MS image for a specified M/Z and RT range within the M/Z and RT ranges acquired by mass spectrometer. There are various embodiments of the LC/MS image query module, some of which serve compatible chunks for the image-processing algorithm for a plurality of biological samples or serve areas of an LC/MS image for visualization. Other embodiments of the LC/MS image query module facilitate querying a plurality of LC/MS images and summarizing them into chromatograms or spectrums. The input into the LC/MS image query module is a list of LC/MS images associated with biological samples in a given experiment, M/Z range, RT range, and level of summarization. The level of summarization can be LC/MS image, total ion current (TIC) chromatogram, base peak intensity (BPI) chromatogram, or spectrum. The total ion current chromatogram represents the summed intensities across the entire range of masses being detected at every point in the analysis. The base peak chromatogram represents intensities for only the most intense peak in each spectrum.

An alternative process for requesting a plurality of LC/MS images, chromatograms, or spectrums facilitates passing a list of LC/MS files from an experiment and RT and M/Z ranges. The method reads chunk size, global M/Z and RT grids, together forming the experiment header file. The method performs a binary search on sorted arrays of RT and M/Z grid values to find corresponding RT indexes for the requested RT range and correspondent M/Z indexes for the requested M/Z range. The method determines chunk numbers for the requested M/Z range using M/Z grid size, and chunk size. The method locates chunked files to read based on chunk numbers determined in the method and list of LC/MS files in the request. The method also calculates local to the chunk column and row indexes to read from the chunked file using the position of the chunk relative to the global M/Z grid. The method further creates list of tasks in a queue for the parallel chunk reader. There are many ways to implement a task queue. A database table is one way of implementation. A chunk reading task consists of a file path to the chunk and index ranges for columns and rows to read from the intensity matrix stored in this chunk. The method also pulls a task from the queue, and then reads sequentially compressed intensity vectors within the RT range requested, leveraging the random access chunked file structure. The method additionally restores compressed zeros in the intensity vectors forming a two-dimensional intensity matrix. The method can be simultaneously executed in multiple threads or processes. The method yet further receives chunks and assembles the resulting LC/MS image requested. The method also optionally summarizes resulting LC/MS image into a chromatogram or spectrum if such summarization type is requested.

While illustrative embodiments have been illustrated and described, it will be appreciated that various changes can be made therein without departing from the spirit and scope of the invention.

The invention claimed is:

1. A method for solving a technical problem of managing increasing volumes of mass spectrometry data in biological experiments by CPU- and memory-intensive image processing so as to facilitate parallel processing, comprising:
   recording liquid chromatography-mass spectrometry (LC/MS) spectra where biological substances are separated by retention time and by mass over charge by different instruments producing raw LC/MS data generated from different formats;
   unifying raw LC/MS data generated from different formats to create LC/MS images;
   chunking the LC/MS images into chunks to facilitate parallel processing, each chunk of each LC/MS image corresponding to the same ranges of retention time and mass over charge of another LC/MS image;
   compressing chunked LC/MS images to facilitate storage and input/output requirements;
   distributing the chunked LC/MS images to a multi-node cloud computing infrastructure;
   providing random access to data within a chunk to minimize number bytes service reads from storage and transferring to a computational node; and
   causing parallel processing.

2. The method of claim 1, wherein unifying includes calculating a global RT grid or both a global RT grid and a global M/Z grid.

3. The method of claim 2, wherein calculating a global M/Z grid includes searching for mass scans within selected raw LC/MS files that have the highest number of M/Z and intensity value pairs, and calculating a delta M/Z value by calculating a difference between next and previous adjacent M/Z measurements with non-zero intensities.

4. The method of claim 3, wherein calculating a global M/Z grid includes fitting a polynomial regression function for the M/Z, delta M/Z pairs, and estimating coefficients of the polynomial regression function.

5. The method of claim 4, wherein elements of global M/Z grid vector are prepared to be calculated recursively using a polynomial regression model.

6. The method of claim 2, wherein calculating a global RT grid includes determining retention grid step size by calculating mean or median from instrument sampling rate, and wherein elements of a global RT grid vector are calculated using a sum of two summands, one summand being a minimum retention time value from a specified RT range and the other summand being a product of a retention time step size and an index into the global RT grid vector.

7. The method of claim 2, wherein unifying further includes interpolating mass scans into the global M/Z grid forming the LC/MS images with a two-dimensional intensity matrix.

8. The method of claim 7, wherein interpolating includes transforming raw intensity values from the mass scans using linear interpolation into a new intensity vector corresponding to the global M/Z grid.

9. The method of claim 8, wherein transforming includes reading mass scans sequentially from raw LC/MS files and streaming interpolated intensity vectors to a temporary file.

10. The method of claim 2, wherein unifying further includes iterating through rows of LC/MS images and interpolating them into a calculated RT grid using linear interpolation.

11. A system for solving a technical problem of managing increasing volumes of mass spectrometry data in biological experiments by CPU- and memory-intensive image processing so as to facilitate parallel processing, comprising:
   format-unifying hardware, the logic structure of which is suitable for:
      recording liquid chromatography-mass spectrometry (LC/MS) spectra where biological substances are separated by retention time and by mass over charge by different instruments producing raw LC/MS data generated from different formats;
      unifying raw LC/MS data generated from different formats to create LC/MS images;
   chunking hardware, the logic structure of which is capable of:
      chunking the LC/MS images into chunks to facilitate parallel processing, each chunk of each LC/MS image corresponding to the same ranges of retention time and mass over charge of another LC/MS image; and
   compression hardware, the logic structure of which has the capacity for:
      compressing chunked LC/MS images to facilitate storage and input/output requirements;
      distributing the chunked LC/MS images to a multi-node cloud computing infrastructure;
      providing random access to data within a chunk to minimize number bytes service reads from storage and transferring to a computational node; and
      causing parallel processing.

12. A non-transitory computer-readable medium having stored thereon computer-executable instructions for implementing a method for solving a technical problem of managing increasing volumes of mass spectrometry data in biological experiments by CPU- and memory-intensive image processing so as to facilitate parallel processing, comprising:
   recording liquid chromatography-mass spectrometry (LC/MS) spectra where biological substances are separated by retention time and by mass over charge by different instruments producing raw LC/MS data generated from different formats;
   unifying raw LC/MS data generated from different formats to create LC/MS images;
   chunking the LC/MS images into chunks to facilitate parallel processing, each chunk of each LC/MS image corresponding to the same ranges of retention time and mass over charge of another LC/MS image;
   compressing chunked LC/MS images to facilitate storage and input/output requirements;
   distributing the chunked LC/MS images to a multi-node cloud computing infrastructure;
   providing random access to data within a chunk to minimize number bytes service reads from storage and transferring to a computational node; and
   causing parallel processing.

13. The method of claim 12, wherein unifying includes calculating a global RT grid or a global M/Z grid or both.

14. The method of claim 13, wherein calculating a global M/Z grid includes searching for mass scans within selected raw LC/MS files that have the highest number of M/Z and intensity value pairs, and calculating a delta M/Z value by calculating a difference between next and previous adjacent M/Z measurements with non-zero intensities.

15. The method of claim 14, wherein calculating a global M/Z grid includes fitting a polynomial regression function for the M/Z, delta M/Z pairs, and estimating coefficients of the polynomial regression function.

16. The method of claim 15, wherein elements of global M/Z grid vector are prepared to be calculated recursively using a polynomial regression model.

17. The method of claim 13, wherein calculating a global RT grid includes determining retention grid step size by calculating mean or median from instrument sampling rate, and wherein elements of a global RT grid vector are calculated using a sum of two summands, one summand being a minimum retention time value from a specified RT range and the other summand being a product of a retention time step size and an index into the global RT grid vector.

18. The method of claim 13, wherein unifying further includes interpolating mass scans into the global M/Z grid forming the LC/MS images with a two-dimensional intensity matrix.

19. The method of claim 18, wherein interpolating includes transforming raw intensity values from the mass scans using linear interpolation into a new intensity vector corresponding to the global M/Z grid.

20. The method of claim 19, wherein transforming includes reading mass scans sequentially from raw LC/MS files and streaming interpolated intensity vectors to a temporary file.

21. The method of claim 13, wherein unifying further includes iterating through rows of LC/MS images and interpolating them into a calculated RT grid using linear interpolation.

* * * * *